United States Patent [19]
Smith

[11] Patent Number: 4,585,908
[45] Date of Patent: Apr. 29, 1986

[54] DATA ENTRY AND DISPLAY CONTROL CIRCUIT

[75] Inventor: Louis W. Smith, St. Petersburg, Fla.

[73] Assignee: GTE Communication Systems Corporation, Northlake, Ill.

[21] Appl. No.: 670,510

[22] Filed: Nov. 13, 1984

[51] Int. Cl.⁴ .............................................. H04M 1/26
[52] U.S. Cl. ................................ 179/81 C; 179/81 R; 179/90 D; 179/99 LS
[58] Field of Search ............. 179/2 DP, 84 VF, 81 R, 179/81 C, 84 L, 84 A, 99 LS, 2 A, 90 BD, 90 B, 90 D; 340/825.31, 825.48, 825.32

[56] References Cited

U.S. PATENT DOCUMENTS

| | | | |
|---|---|---|---|
| 4,223,183 | 9/1980 | Peters, Jr. ................... | 179/84 VF X |
| 4,440,977 | 4/1984 | Pao et al. ..................... | 179/84 VF X |
| 4,453,040 | 6/1984 | Wolf et al. ................... | 179/90 D X |
| 4,453,042 | 6/1984 | Wolf et al. ................... | 179/90 D X |
| 4,536,620 | 8/1985 | Wagner et al. ................ | 179/90 D |

OTHER PUBLICATIONS

G. A. Abbink, "Bridging the Worlds of the Deaf and Hearing", Telephony May 24, 1982, p. 76.

Primary Examiner—James L. Dwyer
Attorney, Agent, or Firm—Gregory G. Hendricks

[57] ABSTRACT

A data entry and display control circuit for use in a telephone having a keypad and a plurality of features and pushbuttons. Each button can be programmed to execute one of the features. The telephone also includes a microprocessor and visual and audible prompting devices. These devices are operated by the microprocessor in response to prolonged operation of a selected pushbutton. Keypad initiated programming signals are then provided to both identify the feature to be assigned to the selected pushbutton and to control display functions. The microprocessor subsequently causes the assigned feature to be performed in response to momentary operation of the selected pushbutton. It also causes the cursor to move in response to the display function control signals.

21 Claims, 2 Drawing Figures

DATA ENTRY AND DISPLAY CONTROL

DATA ENTRY AND DISPLAY CONTROL CIRCUIT

FIELD OF THE INVENTION

The present invention relates to telephone stations and more particularly to a telephone having programmable features and display screen control functions.

BACKGROUND OF THE INVENTION

Programmable telephones having a variety of features are well known. However, these telephones typically require complex arrays of control and keypad buttons to be dedicated to particular features. These telephones are typically require complex and lengthy user programming operations.

A recent improvement was disclosed in U.S. Pat. No. 4,453,040, entitled "Telephone Feature Assignment Circuit." That patent was issued on June 5, 1984 to L. W. Smith and A. L. Wolf. However, the improvement disclosed therein was limited to entry of numerical data.

The present invention discloses a novel data entry and display control circuit which allows pushbuttons to be programmed for various telephone features in response to alphanumeric data entry from a standard telephone keypad. This novel invention also discloses an arrangement for controlling both the positioning of the cursor on a display screen, and other display functions, from a standard telephone keypad.

SUMMARY OF THE INVENTION

In accordance with the present invention a data entry and display control circuit is provided for use in a telephone which includes a plurality of switches, each being operative to successively provide a plurality of appearances of a switch signal, and a keypad being operative to provide a plurality of character signals. The telephone is operative to provide a plurality of features, each in response to operation of a different switch. The data entry and display control circuit comprises storage means having a plurality of storage locations and it is operative to store a plurality of feature codes, each being associated with one of the plurality of features.

A microprocessor is also included and it is connected between the switches and the storage means. The microprocessor is operative in response to the occurrence, in succession for each switch, of a first appearance of predetermined duration of the switch signal, at least one pair of character signals having a predetermined relationship to one of the feature codes, and a second appearance of predetermined duration of the switch signal. The microprocessor then stores in the storage means a data code associating the switch with the programmed feature code, whereby each switch is programmed to operate an associated feature.

A display screen is also included and it is connected to the microprocessor. The display screen includes a positionable cursor. The microprocessor is operative in response to predetermined pairs of character signals to vary the position of the cursor, and it is further operative in response to other predetermined pairs of character signals to delete or insert data as defined by a subsequent pair of characters. Such deletions and insertions are made at the location indicated by the cursor.

DESCRIPTION OF THE PREFERRED EMBODIMENT

Figure 1:
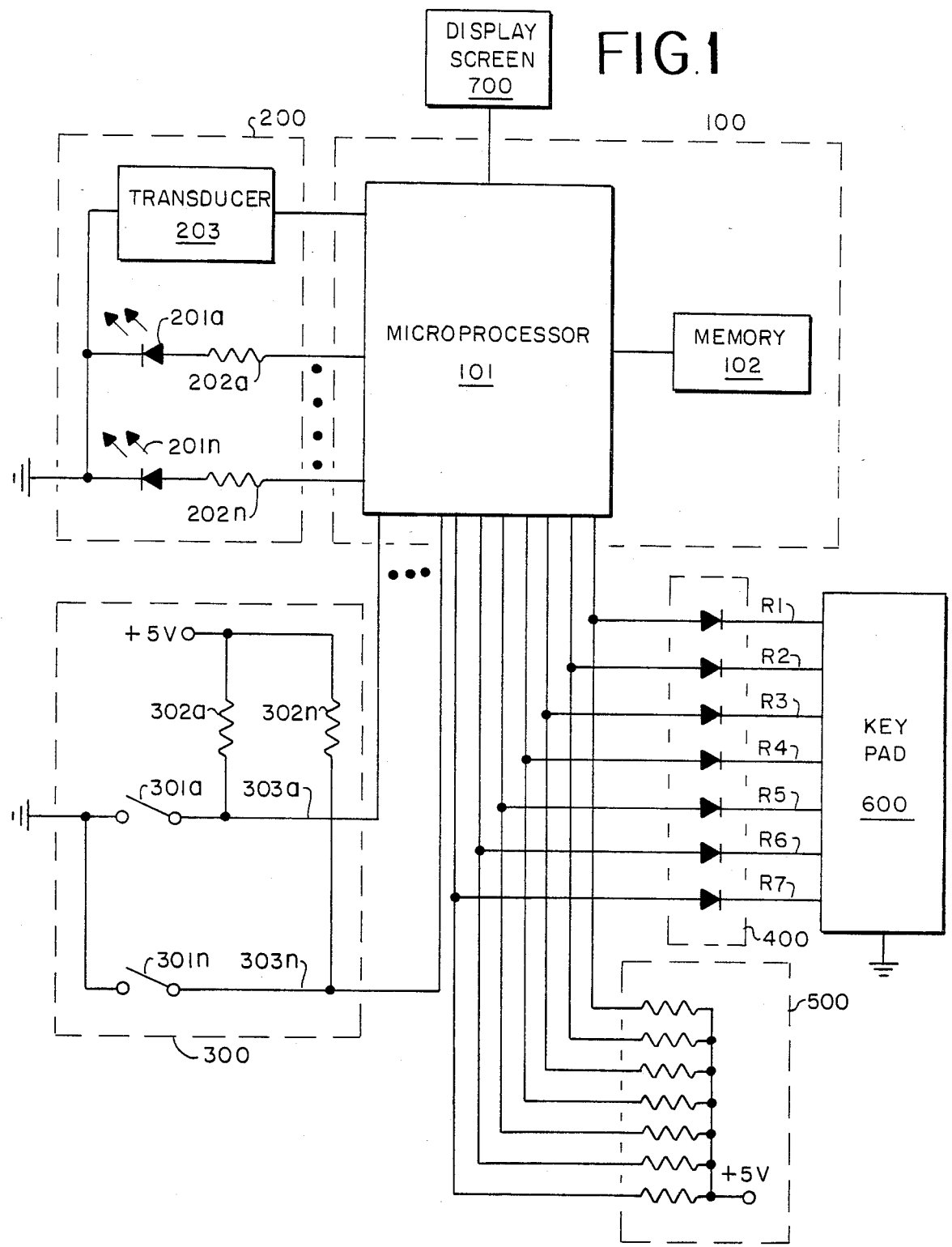
FIG. 1 of the accompanying drawing is a schematic diagram of a data entry and display control circuit in accordance with the present invention.
Figure 2:
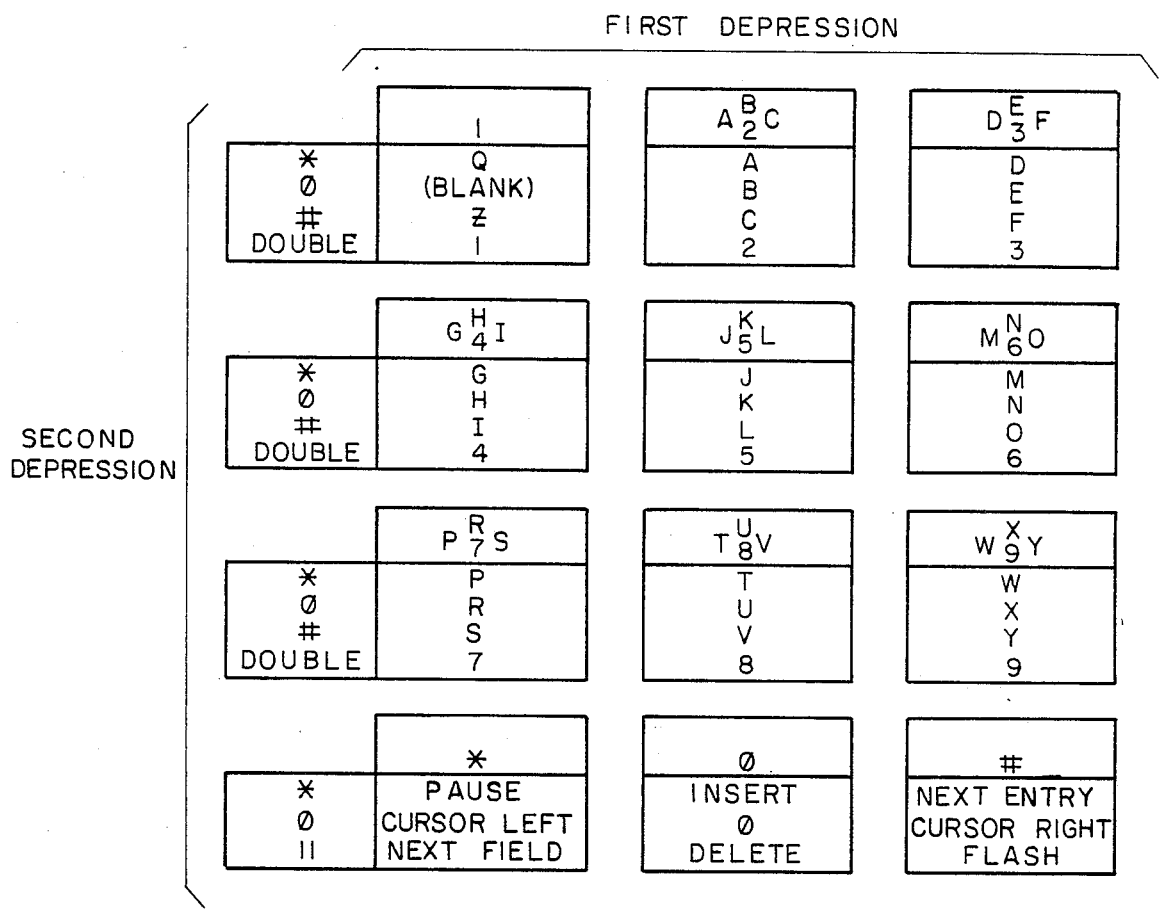
FIG. 2 is a Table showing an algorithim of keyboard actuations which represent alpha-numeric characters and cursor control.

Referring now to the accompanying drawing the data entry and display control circuit of the present invention is shown. Modern electronic telephones have many features, each of which can be executed in response to operation of an associated pushbutton. Such features often include speed calling, last number redial and station lock. The data entry and display control circuit of the present invention discloses an arrangement for data entry and programming of selected pushbuttons to execute assigned features. Upon completion of such programming the assigned feature can be executed by momentary operation of the push-button assigned to it. This invention also discloses an arrangement for display control in response to keypad signals.

This circuit includes processing unit 100 connected to audible and visual display circuit 200, switch circuit 300, diode network 400 and resistor network 500. Also keypad 600 is connected to diode network 400 and dislay screen 700 is connected to processing unit 100. This display screen is typically a cathode ray tube (CRT).

Processing unit 100 includes microprocessor 101 connected to memory 102. Display circuit 200 includes light emitting diodes (LEDs) 201a–201n, resistors 202a14 202n and transducer 203. Switch circuit 300 includes switches 301a–301n, each of which is connected to ground when an associated pushbutton is depressed. Switches 301a–301n are also connected to a +5 volt supply via resistors 302a–302n, respectively. Each of these switches is further connected to microprocessor 101 via an associated one of leads 303a–303n. Diode network 400 includes seven protection diodes connected to keypad 600 via four row (R1–R4) and three column (C1–C3) leads. These diodes protect microprocessor 101 from extraneous high voltage signals at keypad 600.

Keypads, transducers, display screens, microprocessors and memories are old and well known. Keypads typically include four rows and three columns of pushbuttons. Each pushbutton connects an associated row and column lead to ground when it is operated. Resistor network 500 includes seven resistors connected to the +5 volt source. Each resistor is further connected to an associated diode in diode network 400.

To program a feature, e.g. station lock, to a particular pushbutton, a selected pushbutton is depressed and held depressed for a predetermined time, e.g. three seconds. This causes the associated switch, e.g. 301a, to close and connect an associated lead, e.g. 303a, to ground. Microprocessor 101 then detects the resultant first appearance of a logic level 0 switch signal on lead 303a. If this signal is present for the required predetermined time microprocessor 101 determines it to be a feature programming request. If this signal is only momentarily present, e.g. less than 1.5 seconds, microprocessor 101 determines it to be a feature execution request.

When a feature programming request is made for the pushbutton connected to switch 301a, microprocessor 101 applies a steady logic level 1 first sensible control signal to LED 201a (first sensible indicating means) and a short duration, e.g. 300 milliseconds, logic level 1 second sensible control signal to transducer 203 (second sensible indicating means). LED 201a then provides a steady light or first visual signal and transducer 203 provides a single beep tone or first audible signal. These signals acknowledge prolonged operation of the pushbutton connected to switch 301a. When this pushbutton is subsequently released, microprocessor 101 detects the resultant logic level 1 signal on lead 303a and applies a periodic or pulsing logic level 1 third sensible control signal to LED 201, causing it to flash at a rate of 120 interruptions per minute. This second visual signal acts as a prompting signal for more information. Microprocessor 101 then enters the programming mode and the keypad is placed in the dual stroke mode.

Selected keypad buttons are then successively depressed to provide signals representative of the selected feature code. Two keypad buttons are depressed successively to represent each entry. For example, to record a number 5, the keypad button with the number "5" is depressed twice. Similarly, to record a letter "F", the keypad buttons "3" and "#" are successively depressed.

The algorithm for the data patterns to be used for data entry under this dual stroke mode is represented in the FIG. 1, Data entry and Display Control table. As shown in the table, numbers are entered by two depressions of the keypad button with the selected number on it. However, letters are entered by depression of the keypad button with the selected letter, followed by depression of (a) the keypad button "*" if the selected letter is the left letter on the previously depressed keyboard button; or (b) the keypad button "0" if the selected letter is the middle letter on the previously depressed keypad button; or (c) the keypad button "#" if the selected letter is the right letter on the previously depressed keypad button. The telephone control functions pause and flash are entered by two depressions of the "*" and "#" buttons, respectively.

The display control functions are similarly implemented as follows: (a) the cursor is moved to the left by successive depressions of the "*" and "0" buttons; (b) the cursor is moved to the right by successive depressions of the "#" and "0" buttons; (c) the command for insertion of one dual stroke character is represented by successive depressions of the "0" and "*" buttons; (d) the command for deletion of one character is represented by successive depressions of the "0" and "#"; (e) the cursor is moved to the next field (tab) by successive depressions of the "*" and "#" buttons; and (f) the cursor is moved to the next entry (line drop) by successive depressions of the "#" and "*" buttons.

Microprocessor 101 detects and accumulates the resultant logic level 0 signals on the row and column leads for each depression of a keypad pushbutton. Microprocessor 101 continues to accumulate these row and column signals until the pushbutton connected to lead 301a is depressed and held depressed for a prolonged predetermined time, e.g. 1.5 seconds. This prolonged appearance of a logic level 0 switch signal informs microprocessor 101 that all of the keypad signals for programming the selected feature have been provided. Microprocessor 101 then determines a data code associated with the accumulated row and column signals and stores this data code in memory 102 at a location reserved for the selected pushbutton. Since these data codes are preassigned to the available features, the code identifying the selected feature is now stored in a memory location associated with the pushbutton connected to switch 301a.

Microprocessor 101 then applies a steady logic level 0 fourth sensible control signal LED 201a and a short duration logic level 1 fifth sensible control signal to transducer 203. Transducer 203 then provides a single beep second audible tone and LED 201a is extinguished (third visual signal). These signals indicate completion of th programming of the selected feature to the button connected to switch 301a. Operation of the selected feature can then be executed by momentary depression of the pushbutton connected to switch 301a.

Thus the data entry and display control circuit of the present invention uses a microprocessor and an associated memory to receive and translate pushbutton and keypad button codes representative of telephone features, program codes and data, and cursor control functions.

It will be obvious to those skilled in the art that numerous modifications of the present invention can be made without departing from the spirit of the invention which shall be limited only by the scope of the claims appended hereto.

What is claimed is:

1. A data entry and display control circuit for use in a telephone including a plurality of switches each being operative to successively provide a plurality of appearances of a switch signal, and a keypad being operative to provide a plurality of character signals, said telephone being operative to provide a plurality of features, each in response to operation of a different switch, said data entry and display control circuit comprising:

storage means having a plurality of storage locations and being operative to store a plurality of feature codes, each being associated with one of said plurality of features;

a microprocessor connected between said switches and said storage means, and operative in response to the occurrence, in succession for each switch, of a first appearance of predetermined duration of said switch signal, at least one pair of character signals having a predetermined relationship to one of said feature codes, and a second appearance of predetermined duration of said switch signal, to store in said storage means a date code associating said switch with said one of said feature codes, whereby each switch is programmed to operate an associated feature; and a display screen, connected to said microprocessor, and including a positionable cursor;

said microprocessor being further operative in response to predetermined pairs of character signals to vary the position of said cursor, and being further operative in response to other predetermined pairs of character signals to delete or insert data, as defined by a subsequent pair of characters, at the location indicated by the cursor.

2. A data entry and display control circuit a claimed in claim 1, wherein said microprocessor is operative in response to a predetermined pair of character signals to move the cursor to the left.

3. A data entry and display control circuit as claimed in claim 1, wherein said microprocessor is operative in response to a predetermined pair of character signals to move the cursor to the right.

4. A data entry and display control circuit as claimed in claim 1, wherein said microprocessor is operative in response to a predetermined pair of character signals to move the cursor to a predetermined location.

5. A data entry and display control circuit as claimed in claim 1, wherein said microprocessor is operative in response to a predetermined pair of character signals to move the cursor to a predetermined line.

6. A data entry and display control circuit as claimed in claim 1, wherein there is further included:
first sensible indicating means connected to said microprocessor, said microprocessor being operative in response to said first appearance of said switch signal to provide a first sensible control signal, said first sensible indicating means being operative in response to said first sensible control signal to provide a first sensible signal.

7. A data entry and display control circuit as claimed in claim 1, wherein there is further included:
second sensible indicating means connected to said microprocessor, said microprocessor being operative in response to said first appearance of said switch signal to provide a second sensible control signal, said second sensible indicating means being operative in response to said second sensible control signal to provide a second sensible signal.

8. A data entry and display control circuit as claimed in claim 6, wherein said first sensible indicating means comprises a visual signaling means operative in response to said first sensible control signal to provide a first visual signal.

9. A data entry and display control circuit as claimed in claim 7, wherein said second sensible indicating means comprises audible signaling means operative in response to said second control signal to provide a first audible signal.

10. A data entry and display control circuit as claimed in claim 8, wherein said visual signaling means comprises a light emitting diode operative in response to said first sensible control signal to turn on and thereby provide a light signal.

11. A data entry and display control circuit as claimed in claim 9, wherein said second sensible control signal has a predetermined duration; said audible signaling means comprising an audible transducer operative in response to said second sensible control signal to provide a tone of predetermined duration.

12. A data entry and display control circuit as claimed in claim 6, wherein said microprocessor is further operative in response to termination of said first appearance of said switch signal to provide a third sensible control signal, said first sensible indicating means being operative in response to said third sensible control signal to provide a third sensible signal.

13. A data entry and display control circuit as claimed in claim 12, wherein said first sensible indicating means comprising visual signaling means operative in response to said third sensible control signal to provide a second visual signal.

14. A data entry and display control circuit as claimed in claim 13, wherein said visual indicating means comprises a light emitting diode; and said third sensible control signal is a periodic sensible control signal; said light emitting diode being operative in response to said periodic sensible control signal to periodically turn on and off and thereby provide a flashing light signal.

15. A data entry and display control circuit as claimed in claim 6, wherein said microprocessor is further operative in response to said second appearance of said switch signal to provide a fourth sensible control signal, said first sensible indicating means operative in response to said fourth sensible control signal to provide a fourth sensible signal.

16. A data entry and display control circuit as claimed in claim 15, wherein said first sensible indicating means comprises visual signaling means operative in response to said fourth sensible control signal to provide a third visual signal.

17. A data entry and display control circuit as claimed in claim 16, wherein said visual signaling means comprises a light emitting diode operative in response to said fourth sensible control signal to turn off and inhibit any light signal.

18. A data entry and display control circuit as claimed in claim 7, wherein said microprocessor is further operative in response to said second appearance of said switch signal to provide a fifth sensible control signal, said second sensible indicating means being operative in response to said fifth sensible control signal to provide a fifth sensible signal.

19. A data entry and display control circuit as claimed in claim 18, wherein said second sensible indicating means comprises audible signaling means operative in response to said fifth sensible control signal to provide a second audible signal.

20. A data entry and display control circuit as claimed in claim 19, wherein said audible signaling means comprises an audible transducer operative in response to said fifth sensible control signal to turn on and provide a tone of predetermined duration.

21. A telephone feature assignment circuit as claimed in claim 1, wherein said storage means comprises a memory.

* * * * *